United States Patent
O'Brien et al.

(10) Patent No.: US 10,663,839 B1
(45) Date of Patent: May 26, 2020

(54) TRANSPORTABLE POLE-MOUNTED INSPECTION DEVICE

(71) Applicant: O'Brien Engineering, Inc., Carrollton, TX (US)

(72) Inventors: Norman J. O'Brien, Coppell, TX (US); Joshua W. McClure, Plano, TX (US); Joseph D. O'Brien, Coppell, TX (US)

(73) Assignee: O'Brien Engineering, Inc., Carrollton, TX (US)

(*) Notice: Subject to any disclaimer, the term of this patent is extended or adjusted under 35 U.S.C. 154(b) by 0 days.

(21) Appl. No.: 16/354,989

(22) Filed: Mar. 15, 2019

Related U.S. Application Data

(60) Provisional application No. 62/643,810, filed on Mar. 16, 2018.

(51) Int. Cl.
| | | |
|---|---|---|
| *G03B 13/02* | (2006.01) |
| *G03B 17/56* | (2006.01) |
| *F16M 11/28* | (2006.01) |
| *F16M 11/42* | (2006.01) |
| *F16M 11/18* | (2006.01) |
| *F16M 11/10* | (2006.01) |
| *F16M 11/34* | (2006.01) |

(52) U.S. Cl.
CPC ........... *G03B 17/561* (2013.01); *F16M 11/10* (2013.01); *F16M 11/18* (2013.01); *F16M 11/28* (2013.01); *F16M 11/34* (2013.01); *F16M 11/42* (2013.01); *G03B 13/02* (2013.01)

(58) Field of Classification Search
USPC .......................................... 396/374, 419, 428
See application file for complete search history.

(56) References Cited

U.S. PATENT DOCUMENTS

| | | | | |
|---|---|---|---|---|
| 1,844,113 | A * | 2/1932 | Beidler ................. | F16M 11/34 403/300 |
| 2,553,890 | A * | 5/1951 | Bloch .................... | F16M 11/42 248/188.7 |
| 4,324,477 | A * | 4/1982 | Miyazaki ............... | F16M 11/08 248/163.1 |
| 5,065,249 | A * | 11/1991 | Horn ...................... | F16M 11/10 348/375 |
| 5,305,356 | A * | 4/1994 | Brooks ................... | F16M 11/18 376/249 |
| 6,056,450 | A * | 5/2000 | Walling ................. | F16M 11/10 352/243 |
| 9,568,143 | B2 * | 2/2017 | Ben Meir ............. | G03B 17/561 |
| 10,046,894 | B1 * | 8/2018 | Carter ................... | B65D 69/00 |
| 10,146,106 | B1 * | 12/2018 | Bergmann ........... | G03B 17/561 |
| 2003/0161622 | A1 * | 8/2003 | Zantos .................. | E04H 12/182 396/419 |
| 2006/0147196 | A1 * | 7/2006 | Hein ...................... | B66C 23/18 396/428 |

(Continued)

*Primary Examiner* — Rodney E Fuller
(74) *Attorney, Agent, or Firm* — Frost Brown Todd LLC

(57) ABSTRACT

An inspection device and method for use are described. The inspection device comprises a plurality of nested poles coupled to a wheeled tripod. The poles can be extended outward to create a longer composite pole. A camera can be mounted to the end of the composite pole and the tripod placed near a difficult-to-view location, such as a building roof. The mounted camera can be used to view the location, possibly through wireless transmission to a tablet or other device.

19 Claims, 7 Drawing Sheets

(56) References Cited

U.S. PATENT DOCUMENTS

| | | | | |
|---|---|---|---|---|
| 2009/0003822 | A1* | 1/2009 | Tyner | F16M 11/32 |
| | | | | 396/428 |
| 2009/0014605 | A1* | 1/2009 | Kehl | F16M 11/10 |
| | | | | 248/161 |
| 2009/0084912 | A1* | 4/2009 | Speggiorin | F16M 11/16 |
| | | | | 248/176.3 |
| 2012/0181398 | A1* | 7/2012 | Salvato | F16M 11/10 |
| | | | | 248/122.1 |
| 2012/0181979 | A1* | 7/2012 | Hudspeth | F16M 11/245 |
| | | | | 320/108 |
| 2016/0342072 | A1* | 11/2016 | Sherman | G03B 17/561 |
| 2017/0019588 | A1* | 1/2017 | Gordon | H04N 5/23203 |
| 2018/0080601 | A1* | 3/2018 | Bosnakovic | F16M 11/34 |
| 2018/0106418 | A1* | 4/2018 | Anglin | F16M 11/28 |
| 2019/0128471 | A1* | 5/2019 | Lin | F16M 11/245 |

* cited by examiner

TRANSPORTABLE POLE-MOUNTED INSPECTION DEVICE

CROSS REFERENCE TO RELATED INFORMATION

This application claims the priority of U.S. Provisional Application No. 62/643,810, entitled "Transportable Pole-Mounted Inspection Device", filed Mar. 16, 2018, the contents of which are hereby incorporated herein in its entirety.

TECHNICAL FIELD

The present disclosure is directed to inspection devices for hard to view areas and surfaces.

BACKGROUND OF THE INVENTION

The U.S. Energy Information Administration conducted a survey of commercial buildings in the U.S. in 2012 culminating in a 2015 report. The report states that there are 5.6M buildings containing 87B square feet of space. The federal government owns 775,000 buildings and estimates that 55% of the $23B annual operating cost goes to maintenance.

Owners of such facilities work to maximize the value of dollars spent on maintenance. Periodic and special Facility Condition Assessments (FCA) provide owners with information with which to anticipate and plan routine maintenance and to spot special needs as they develop. Assessments are typically conducted by facilities engineers, architects, consulting engineers, and senior technicians by studying record drawings, making visual observations of the many elements of the facility, and reviewing photographs documenting past and present conditions.

Many elements of a building that bear on its condition are in elevated places that are difficult or risky to access. For instance, air handling equipment in a tall warehouse may be located just below or within the roof trusses and the roofs may be sloped and several stories high making access dangerous. Conventional means of accessing such locations, has been by ladder, scissor-lift or bucket-lift, or perhaps from an adjacent higher building. More recently, some consultants have attempted to use drones to inspect roofs.

Many government facilities have very strict rules prohibiting the use of cell phones/camera phones and wireless devices. This can negatively impact the availability and quality of photographs or even visual observations.

There are several problems with existing solutions, such as personal elevation, drones, pole mounted devices, and others. Any solution that involves placing a worker more than several feet above the ground brings added risks of falling and of dropping items. Many FCA engagements involve sending teams of engineers and architects to conduct the work at installations in various locations. While some facilities may own and maintain very tall ladders and/or stable lifts and permit their use for FCAs, many do not. Availability of the necessary rental equipment may be problematical and such equipment is not portable, often varies significantly from one location to the next and typically requires skill and added safety measures. The dangers include falling from or dropping tools from heights, damaging the sides, windows, and roofs of buildings by ladders leaning at the wrong point or buckets bumping (crashing), and increased potential for electrical shock.

Drone usage has met with mixed results due to airspace restrictions, unpredictable wind currents near structures, limited carrying capacity, limited flight time, liability concerns, public acceptance, and the complexity of safe, controlled flight.

Assessment teams have used pole mounted cameras—a selfie stick, a painter's pole, and a photographer's monopod, however, the practical height limitation seems to be about 25 to 30 feet. The maneuverability of poles beyond about 25' proves very cumbersome and demands both hands and significant upper body strength; this results in the need for an additional person to view and operate the camera or other optics. Stability quickly becomes problematical with even a small device and can increase substantially with even a light wind.

Without the ability to get physically close to an element for inspection/assessment, visibility and clarity are problematical. If an element can be seen from the ground, high resolution binoculars or camera can be used to gather information. However, optical capability comes with added weight (increasing torque), thus reducing the practical height at which it can be used.

BRIEF SUMMARY OF THE INVENTION

One preferred embodiment under the present invention comprises an inspection device. The inspection device can comprise a plurality of poles including an outermost pole and an innermost pole, the plurality of poles configured to nest at least partially within the outermost pole. The device can further comprise a plurality of clamps coupled to the plurality of poles such that the plurality of poles can be extended outward from the outermost pole and clamped in place to create a longer composite pole and a camera mount coupled to the innermost pole, such that when extended outward the camera mount will be distal to the outermost pole. It can further comprise a tripod portion coupled to the outermost pole, the tripod portion comprising a base and a plurality of legs extending from the base to a plurality of support legs, the plurality of support legs coupled to an end of the outermost pole.

A further embodiment under the present disclosure can comprise a camera mount. The camera mount can comprise a first arm comprising a first spring connection point and first and second pins; and a second arm rotatably coupled to the first arm and comprising a second spring connection point, wherein the first and second pins are configured to limit the rotation of the second arm in relation to the first arm. It can further comprise a spring coupling the first and second spring connection points; and an attachment coupled to the second arm and configured to be removably coupled to a camera.

A further embodiment under the present disclosure can comprise a method of inspecting a location. The method can comprise providing an inspection device. The inspection device can comprise a plurality of poles including an outermost pole and an innermost pole, the plurality of poles configured to nest at least partially within the outermost pole; and a plurality of clamps coupled to the plurality of poles such that the plurality of poles can be extended outward from the outermost pole and clamped in place to create a longer composite pole. The device can further comprise a camera mount coupled to the innermost pole, such that when extended outward the camera mount will be distal to the outermost pole; and a tripod portion coupled to the outermost pole, the tripod portion comprising a base and a plurality of legs extending from the base to a plurality of support legs, the plurality of support legs coupled to an end of the outermost pole. The method can further comprise attaching a camera to the camera mount; communicatively coupling the camera to a mobile device; extending the plurality of poles to create a composite pole; placing the inspection device near a location; directing the camera to view the location; and viewing the location via the mobile device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
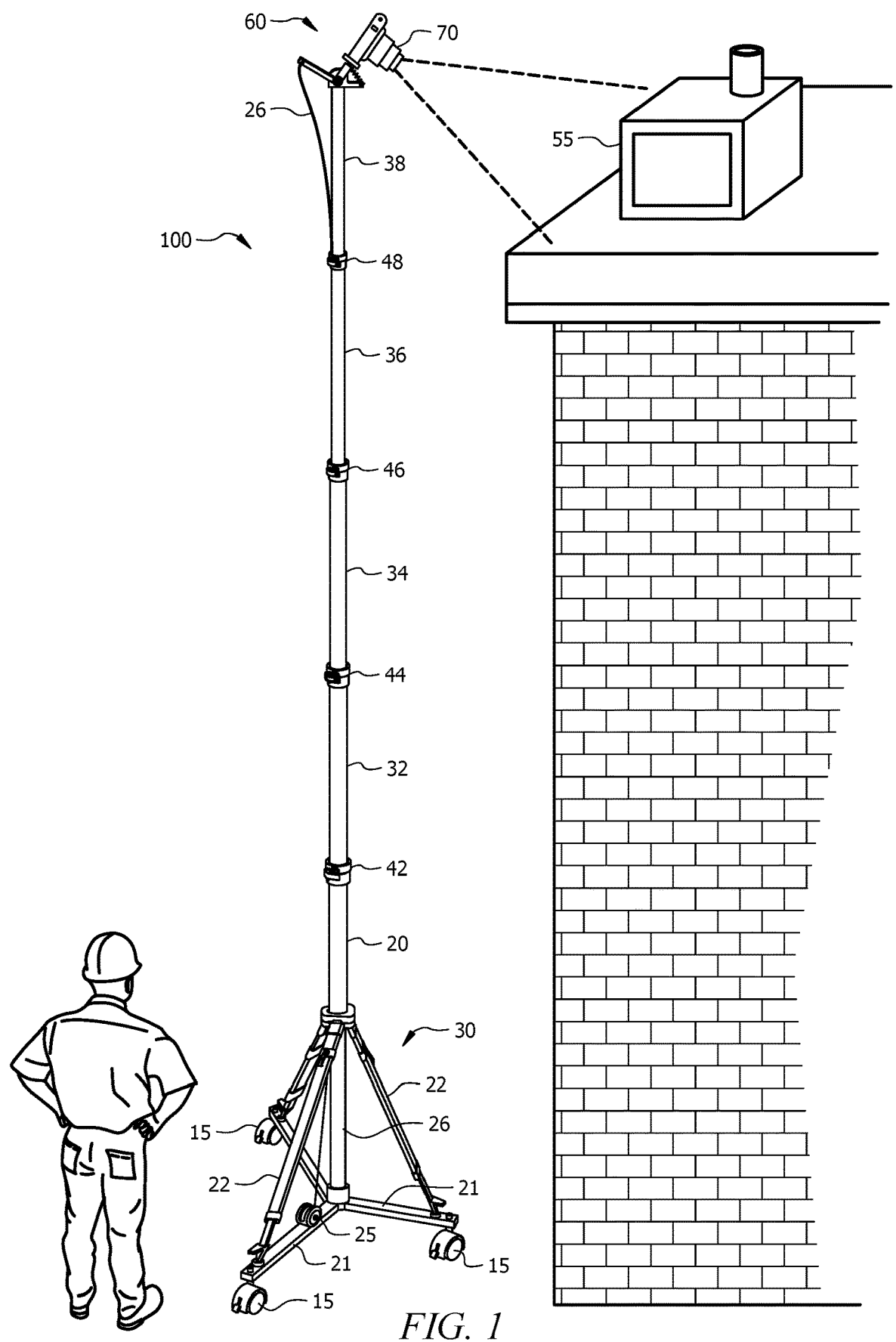
FIG. 1 is a perspective view of an embodiment of a pole mounted inspection device in accordance with the concepts described herein.

The current disclosure includes embodiments of a transportable, mobile, stabilized, pole-mounted, remotely viewed and controlled, high resolution, high zoom, inspection device. Embodiments can incorporate numerous technologies in a single platform that can preferably be: 1) able to be disassembled and transported by a single individual on commercial airlines; 2) able to be raised to a height of 50 feet or more; 3) stable enough to make high resolution high optical zoom observations (e.g., 20× zoom allows for high visibility of a 200 foot wide roof structure from the roof edge); 4) operable using wired or wireless devices to remotely observe and capture the device's view, to control various aspects of the device including the direction, angle, rotation and zoom as well as other functions; 5) capable of stabilized movement allowing for smooth videoing and quick, seamless transition between observation points; and 6) capable of switching to conventional controls in order to be used in a facility whose cyber and physical security restrictions prohibit wireless controls and transmissions.

There are numerous pole-mounted camera devices: news vans and video production groups make use of such, and some inspection groups employ pole-mounted cameras. However, achieving substantial loft with a capable, pole-mounted device that is manageable by one or two team members presents a series of problems: each device capability (high resolution, zoom, wireless, pan, tilt) adds weight which makes the pole prone to whip unless a heavier pole is used (for example, attached to a 45-foot pole, a typical light-weight point and shoot camera and a ball gimbal would add 1.5 lbs. to the end and induce 67.5 foot-lbs. of torque to the operator).

Embodiments under the present disclosure can be composed of a telescoping pole stabilized by a tripod mounted on a dolly for mobility. Counterbalance can be achieved with compartments, or ballasts, that can be filled with water, sand or equipment. A specially designed, light-weight mechanism at the head of the pole, controlled using a retractable cord, can provide tilt function (this can be accomplished by other means including electronic controls with correct, light-weight equipment). A small, light-weight, high optical zoom camera, such as a Sony™ Cybershot DSCWX350 at 4.8 ounces and 20× optical zoom, can be attached to the head of the pole and controlled by a tablet or smartphone with the appropriate application.

In a particular embodiment, A 3" PVC pipe can be used as a transporting container for the pole and may also be used as a base extender for the pole on the mobile tripod. The tripod can be modified to allow the pole base to extend down through the instrument platform to the center of the dolly, which can be modified with a receiver to hold the pole base. The tripod can have adjustable height legs to allow leveling the pole on uneven ground. The dolly can comprise lockable wheels to control movement at discrete observation points. Special brackets clamped to the base column can provide for mounting the table or smartphone for hands-free viewing and single-handed operation.

FIG. 1 displays an embodiment of an inspection device 100 under the present disclosure. Inspection device 100 can carry a camera mount 60 and extend upward, allowing the camera to view the top of a building 55. Device 100 can comprise a plurality of poles 20, 32, 34, 36, 38 that nest within each other and can be locked in place by locks/clamps 42, 44, 46, 48. Each pole can be deployed, as in FIG. 1, or users may choose to only extend some of the poles if a maximum height is not needed. When each pole is extended outward and clamped in place a composite pole is formed of much greater length than any individual pole. Locks/clamps 42, 44, 46, 48 can comprise any type of locking or clamping mechanism. It is preferred that a user be able to lock and loosen the mechanism by hand such that special tools are not needed for deployment. It is preferred that all of the poles will fit within first pole 20. First pole 20 preferably extends from a bottom of base portion 30. Base portion 30 can comprise three legs 22 with wheels 15, and three support legs 21. Preferred embodiments comprise three legs 22 and support legs 21, but embodiments could comprise more or fewer legs 22 and support legs 21 without departing from the current teachings. A spool 25 can store string or wire 26 that extends upward through the nested poles 20, 32, 34, 36, 38 and connects to camera mount 60. A user can pull or release line 26 as needed to adjust the tilt of camera mount 60 to adjust the view shown by camera 70. The embodiment of FIG. 1 shows an inspection device 100 comprising five poles. Other embodiments may comprise more or fewer poles without departing from the current teachings. Embodiments will preferably comprise an outermost pole that is directly coupled to the tripod portion and an innermost pole that is directly coupled to the camera mount. Spool 25 is shown located on a support leg 21. Other embodiments may locate the spool elsewhere, such as on a leg 22, on first pole 20, or even in a user's hands in a detached fashion. Portions of the inspection device can comprise any appropriate material. For the poles, it is preferred to have a high strength and lightweight material, such as carbon fiber.

Figure 2:
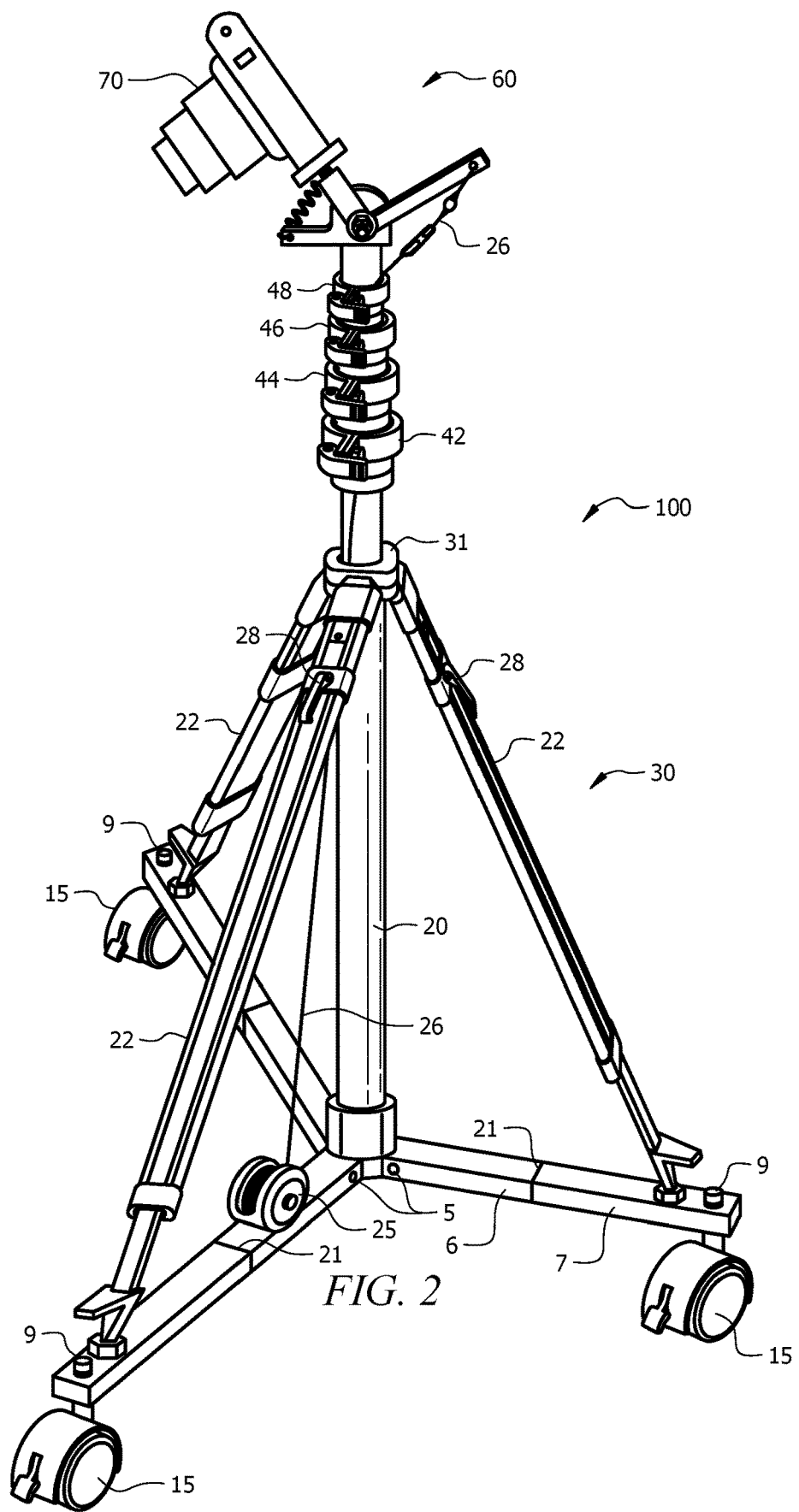
FIG. 2 is a perspective view of an embodiment of the pole mounted inspection device in accordance with the concepts described herein.

FIG. 2 shows an embodiment of inspection device 100 in a nested or retracted state. Poles 32, 34, 36, and 38 of FIG. 1 are nested within first pole 20 though each clamp 42, 44, 46, 48 can be seen above first pole 20. More possible details of tripod portion 30 can be seen in FIG. 2. Tripod base 31 can be located along first pole 20. Legs 22 can extend from base 31 to a connection with support legs 21. A wheel 15 can be located near the end of each support leg 21. Any desired number of wheels can be used. Leg clamps 28 may be used to lock legs 22 in place. Other clamping or locking mechanisms may be used. Spool 25 can comprise a self-retracting mechanism for pulling string 26 inward for storage. String 26 can extend upward through the interior of one or more of the poles 20, 32, 34, 36, 38, or can extend along the exterior of the poles, and attach to the camera mount 60. When a user pulls on the string the tilt of the mount 60 may be adjusted to change what is viewed by the camera 70. Wheels 15 can comprise brakes. Support legs 21 can comprise several extensions 6, 7, one fitting over the other, allowing the extensions to slide outward. When being put away for storage or travel, the extensions can be retracted, and the support leg 21 can rotate about a point 5 and the support legs 21 pointed up or down for a compact package for storage. In some embodiments support legs 21 may not comprise multiple extensions 6, 7 but may comprise a single piece. Legs 22 can connect to support legs 21 at connections 9. Connections 9 may comprise a hole or notch in the support leg 21. Connecting the legs 22 and support legs 21 can utilize an interference fit, a locking mechanism, magnetic connection, or any other appropriate connecting means. When tearing down device 100 for storage or travel, clamps 28 can be unlocked allowing legs 22 to be retracted, legs 22 and support legs 21 disconnected, and support legs 21 and legs 22 can be folded to a generally vertical position along the direction of first pole 20 so that the device 100 can be stowed in a bag, case, or other container.

Figure 3:
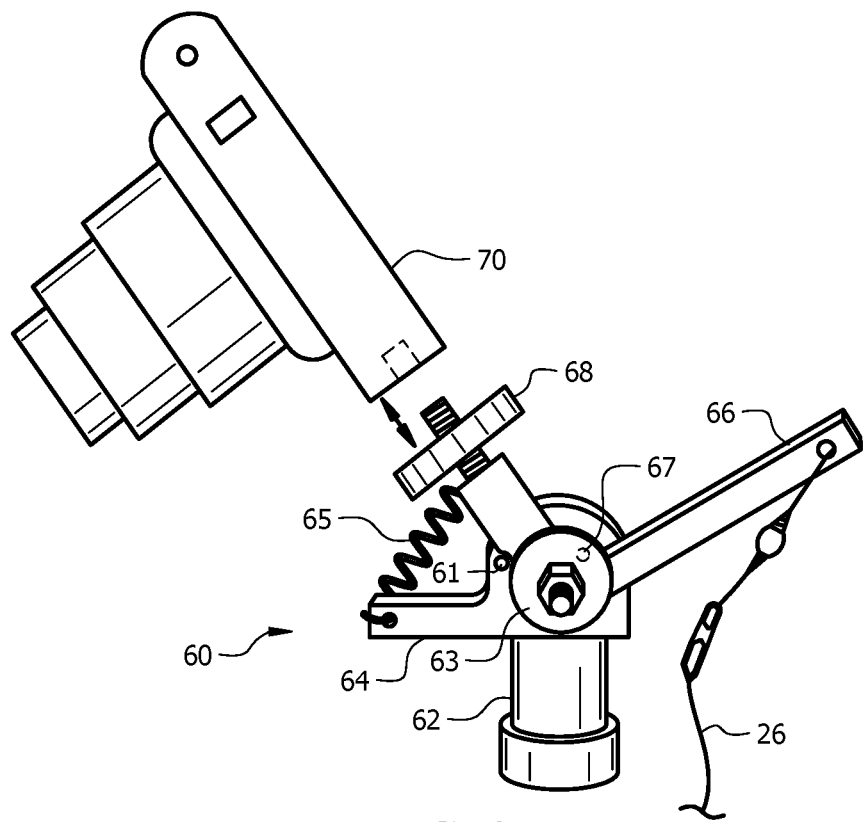
FIG. 3 is a side view of an embodiment of a camera mount for a pole mounted inspection device in accordance with the concepts described herein.

FIG. 3 shows an embodiment of a possible camera mount embodiment 60 under the present disclosure. Mount 60 can comprise a cap portion 62 that may screw onto, or otherwise attach to, a pole of inspection device 100 of FIGS. 1 and 2. Camera mount 60 can further comprise a first arm 64 and a second arm 66 that can both be rotatably attached about a screw 63. Screw 63 can comprise a screw or other central post, nut, and/or washer. An attachment 68 allows a camera 70 to be connected to camera mount 60. Attachment can be by a screw-on attachment, a clip, or other appropriate means. Attachment 68 can comprise a portion of second arm 66. Spring 65 can connect first arm 64 to second arm 66 near the attachment 68. Spring 65, in this embodiment, works to pull second arm 66 in a counter clockwise direction, or toward first arm 64. String 26, connected to spool 25 of FIGS. 1 and 2, can be connected to second arm 66. As a user on the ground pulls on string 26 the second arm 66 can be pulled against the force of string 65 and the tilt of the camera mount 60 can be adjusted so that camera 70 views different locations. Pins 61, 67 can be located on first arm 64 near the screw 63. Pins 61, 67 can function as brakes to stop the movement of first and second arms 64, 66 with respect to each other. Second arm 66 may comprise grooves or notches that interact with pins 61, 67 to restrict rotation.

Figure 4:
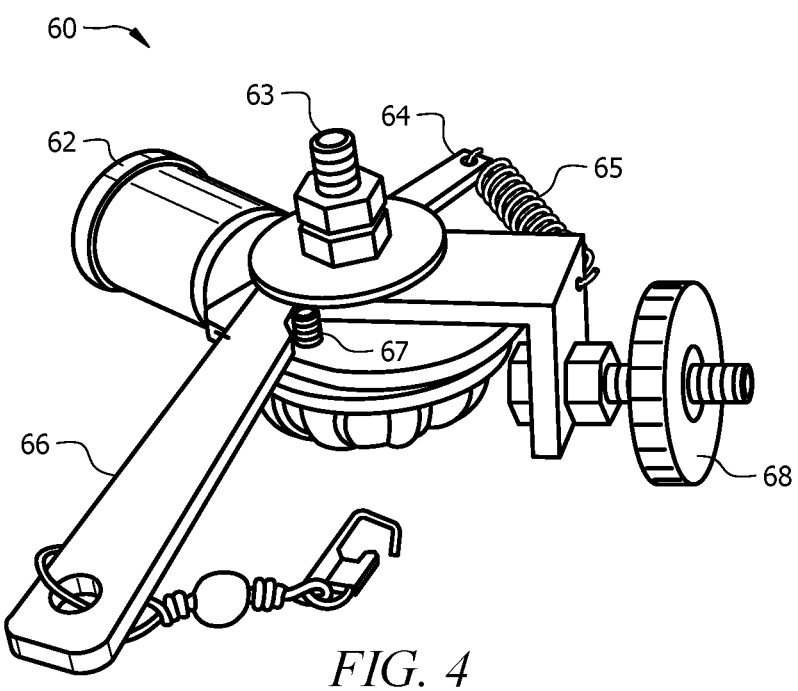
FIG. 4 is a perspective view of the camera mount of FIG. 3.

FIG. 4 shows a camera mount 60 embodiment from another angle. First arm 64 and second arm 66 are visible, as in FIG. 3. FIG. 4 shows a clearer view of pin 67 that may help restrict rotation of second arm 66 in relation to first arm 64. Attachment 68 is shown as a screw connected to a bent portion of second arm 66. Other means of combing attachment 68 to second arm 66 are possible. These elements may be integrated together as a single piece.

Figure 5:
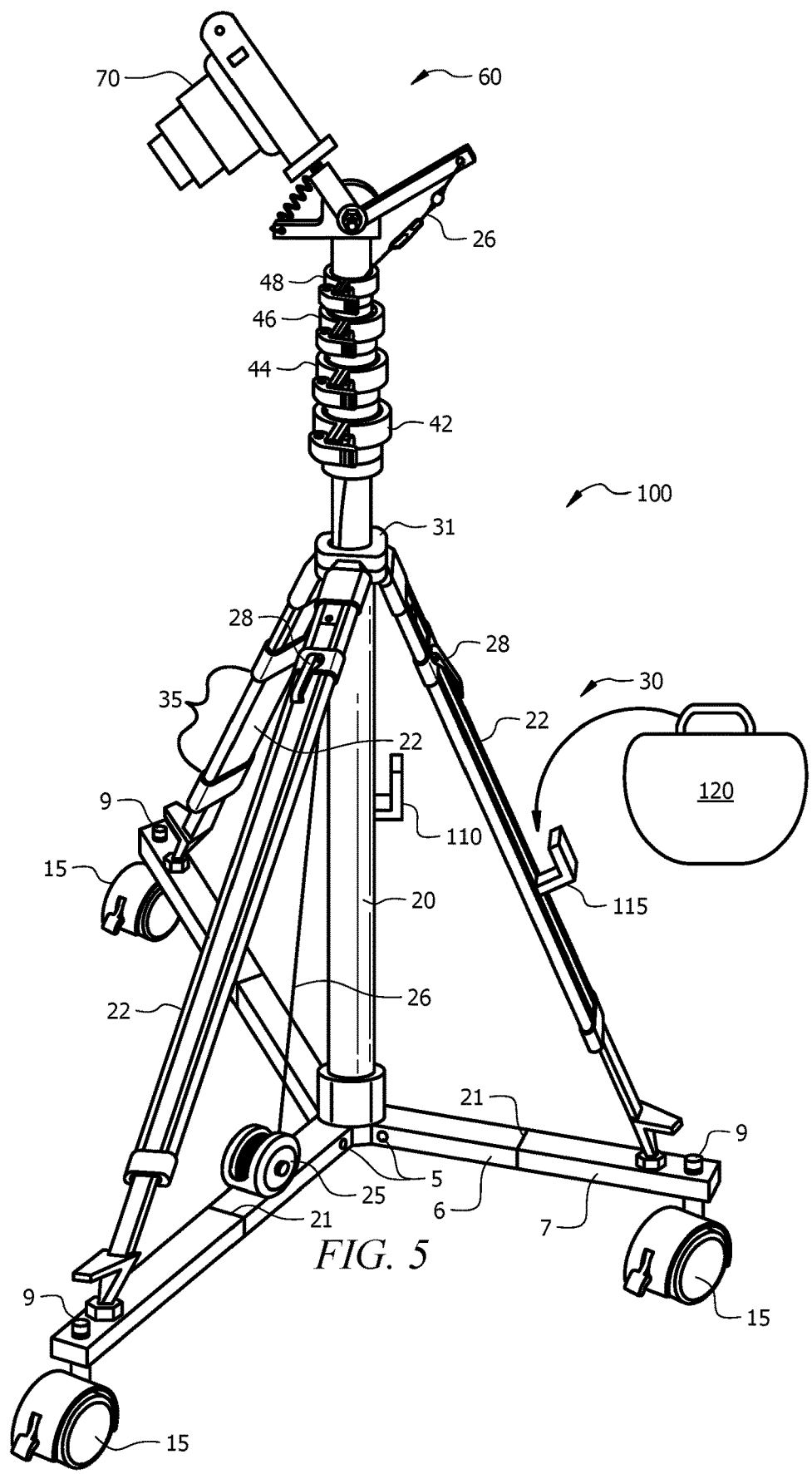
FIG. 5 is a perspective view of an embodiment of the pole mounted inspection device with ballast hooks in accordance with the concepts described herein.

FIG. 5 displays another possible embodiment of an inspection device under the present disclosure. In this embodiment device 100 comprises hooks 110 and 115. Hooks 110, 115 may be detachable or permanently affixed to device 100. Hooks 110, 115 can serve to hold a ballast, backpack, laptop bag, or other bag 120 so as to weigh down device 100 and prevent against tipping or getting blown over. Bag 120 may comprise a vessel for filling with rocks, sand, water, or other material or items. Everyday items can also fill the bag 120, such as a user's personal items. Hooks 110, 115 can be located at any appropriate location on device 100. Spool 25 can comprise a retractor button as well as a casing. Line 26 can be passed through the center of first pole 20 and through the nested poles and can connect to the camera mount 60. A user can pull and release line to direct the tilt of a camera on the mount 60. Handle 35 can be used for transport, positioning, or other purposes. Some embodiments can comprise a carrying strap. Other embodiments of the present disclosure may use different means for adjusting camera position. Panning is preferably accomplished by rotating the composite pole or center pole in the tripod or by rotating the entire device by spinning the tripod itself. A mount that is capable of both tilting and panning can also be used with the inspection device.

Figure 6:
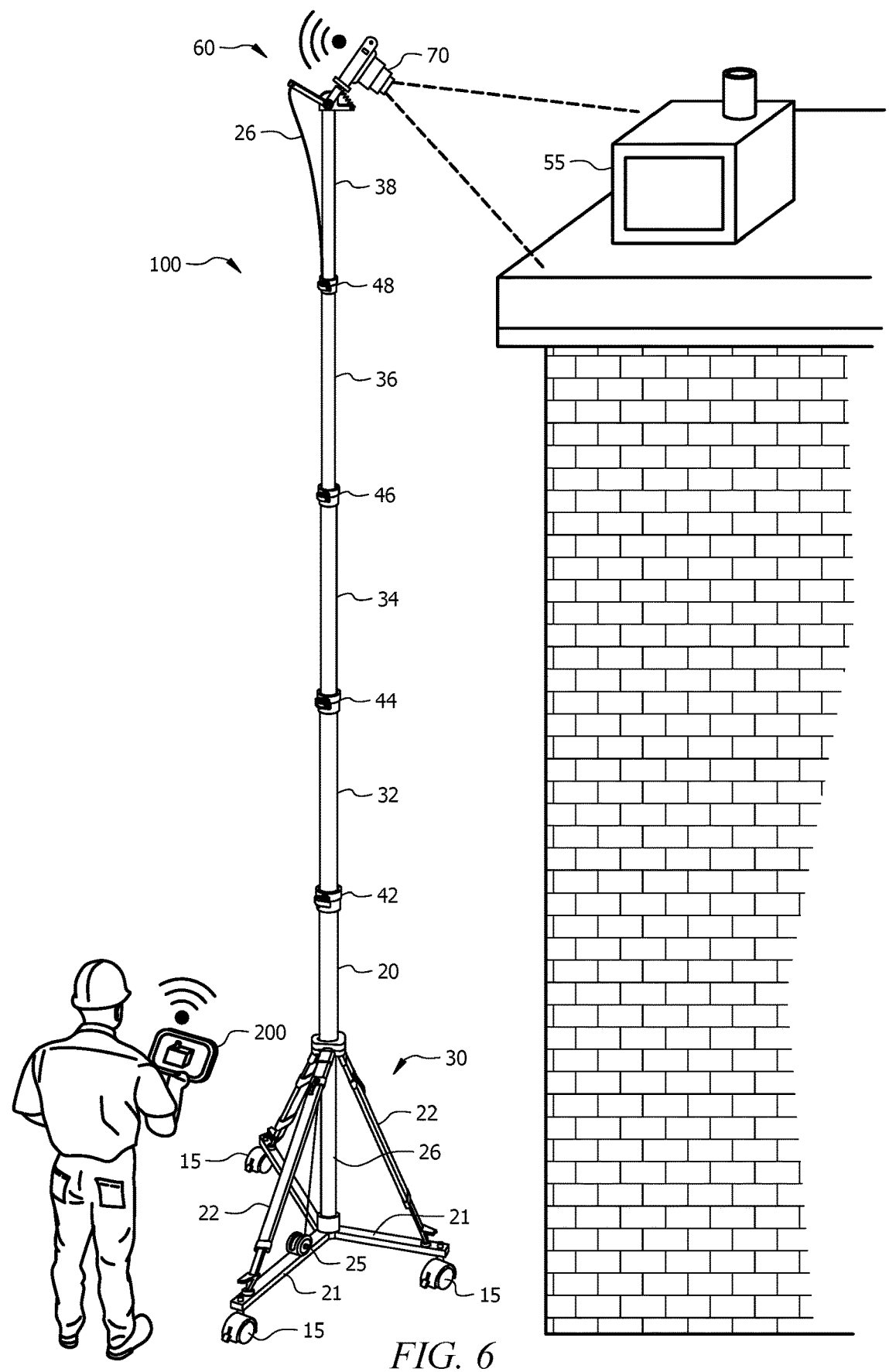
FIG. 6 is a perspective view of an embodiment of the pole mounted inspection device having real time wireless photo/video capability in accordance with the concepts described herein.

FIG. 6 shows a further embodiment of an inspection device 100 under the present disclosure. In FIG. 5 the user can use a tablet or other connected device 200 to have a real time view of what camera 70 is viewing. In this embodiment, device 200 and camera 70 can both comprise a Bluetooth chip, Wi-Fi chip, or other communication means whereby they can couple together and allow a user to see the view of camera 70.

Figure 7:
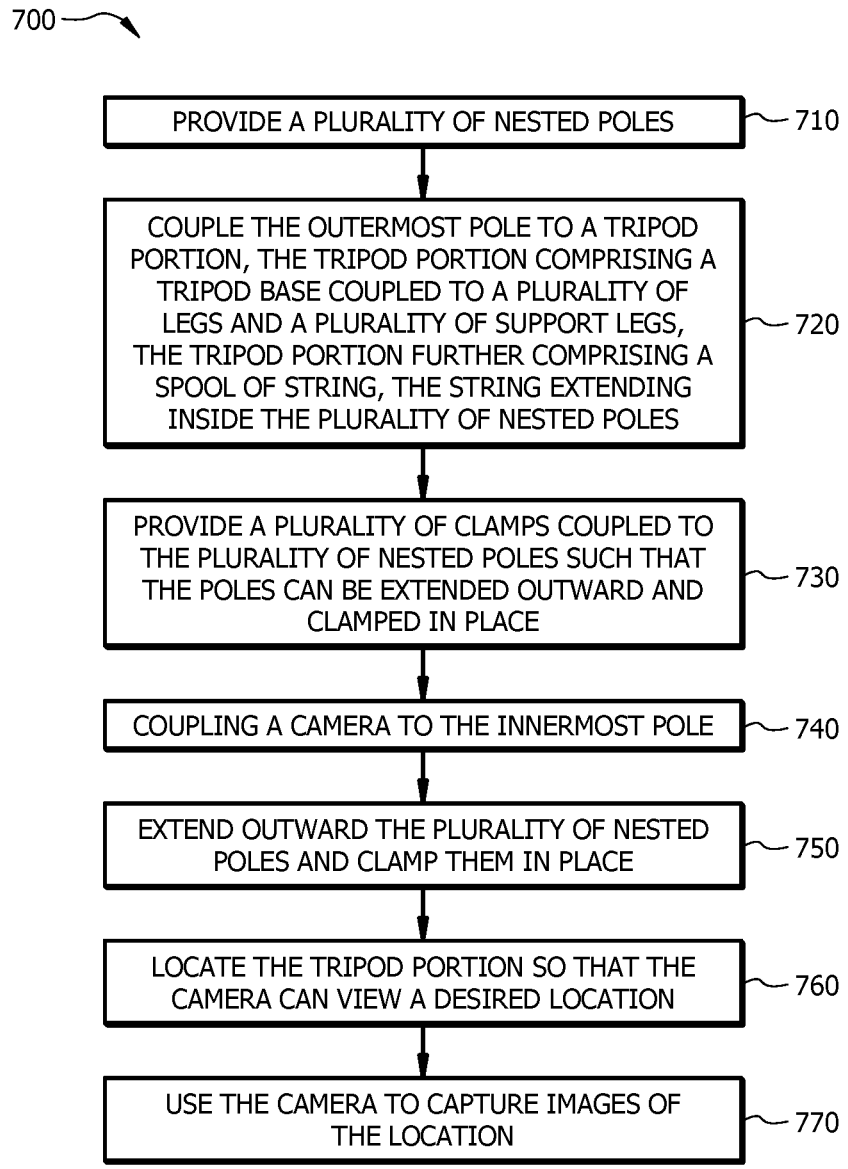
FIG. 7 is a flow chart diagram of an embodiment of a method of using a pole mounted inspection device in accordance with the concepts described herein.

FIG. 7 shows a possible method embodiment under the present disclosure. Under method 700, a plurality of nested poles can be provided at 710. At 720, the outermost nested pole is coupled to a tripod portion comprising a tripod base coupled to a plurality of legs and a plurality of support legs. The tripod portion can further comprise a spool of string, the string extending inside the plurality of nested poles. At 730, a plurality of clamps is coupled to the plurality of nested poles such that the poles can be extended outward and clamped in place to create a longer composite pole. At 740, a camera is coupled to the innermost pole and to the string, such that the string can adjust the tilt of the camera. At 750, the plurality of nested poles are extended outward and clamped in place to form the composite pole. At 760, the tripod portion can be located so that the camera can view a desired location. At 770, images can be captured of the location using the camera.

Figure 8:
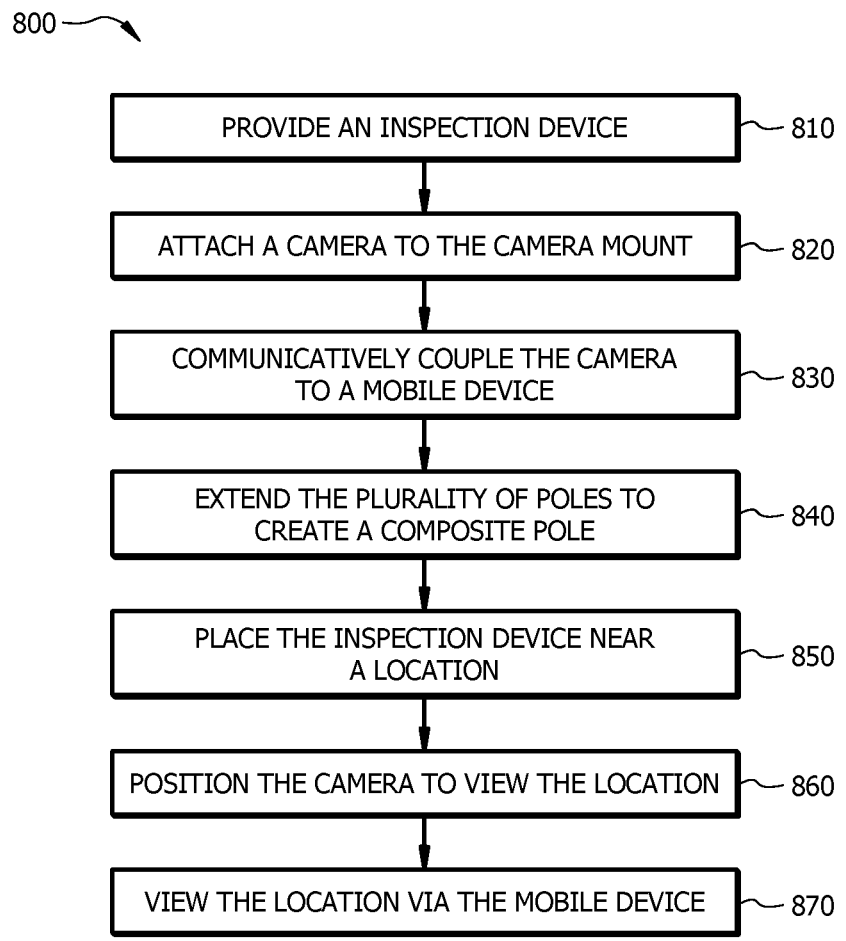
FIG. 8 is a flow chart diagram of an embodiment of a method of using a pole mounted inspection device in accordance with the concepts described herein.

FIG. 8 shows another possible method embodiment 800 under the present disclosure. At 810, an inspection device is provided, such as described herein. At 820, a camera is attached to the camera mount. At 830, the camera is communicatively coupled to the mobile device. At 840, the plurality of poles is extended to create a composite pole. At 850, the inspection device is placed near a location. At 860, the camera is positioned to view the location. At 870, the location is viewed via the mobile device that shows the view of the camera.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An inspection device comprising:
  a plurality of poles including an outermost pole and an innermost pole, the plurality of poles configured to nest at least partially within the outermost pole;
  a plurality of clamps coupled to the plurality of poles such that the plurality of poles can be extended outward from the outermost pole and clamped in place to create a longer composite pole;
  a camera mount coupled to the innermost pole, such that when extended outward the camera mount will be distal to the outermost pole;
  a wire extending from the camera mount through one or more of the plurality of poles, the wire controlling the tilt of the camera mount; and
  a tripod portion coupled to the outermost pole, the tripod portion comprising a base and a plurality of legs extending from the base to a plurality of support legs, the plurality of support legs coupled to an end of the outermost pole, each leg of the tripod mount including a wheel, and one or more of the legs including a ballast hook, the ballast hook sited on the one or more legs such that a ballast on the ballast hook does not interfere with the operation of the wheels.

2. The inspection device of claim 1 further comprising a camera coupled to the camera mount and a tablet, the tablet configured to communicatively couple to the camera and to display to a user a real-time image from the camera.

3. The inspection device of claim 1 wherein the ballast is a weighted bag.

4. The inspection device of claim 1 wherein tripod portion further comprises a spool, the spool configured to store the wire, the wire configured to be pulled by a user to adjust a position of a camera.

5. The inspection device of claim 1 wherein the plurality of legs and the plurality of support legs are configured to fold down for transport.

6. The inspection device of claim 1 further comprising a handle for transport.

7. The inspection device of claim 1 further comprising one or more wheel brakes.

8. A camera mount comprising:
  a first arm comprising a first spring connection point at a distal end of the first arm and further comprising first and second pins on opposite sides of a pivot point;
  a second arm rotatably coupled to the first arm at the pivot point wherein the first arm is fixed and the second arm rotates relative to the first arm, and comprising a second spring connection point at a distal end of the second arm, wherein the first and second pins are configured to limit the rotation of the second arm in relation to the first arm by engaging the second arm at particular points of the rotation of the second arm;
  a spring coupling the first and second spring connection points; and
  an attachment coupled to the second arm and configured to be removably coupled to a camera.

9. The camera mount of claim 8 wherein the second arm further comprises a line connection point configured to allowing for coupling to a wire that can adjust the position of the second arm in relation to the first arm.

10. The camera mount of claim 8 further comprising a cap portion configured to be coupled to a pole.

11. The camera mount of claim 8 wherein the attachment is configured to be screwed into a camera.

12. The camera mount of claim 8 wherein the second arm further comprises one or more notches configured to engage the first or second pins.

13. The camera mount of claim 8 wherein the first and second arms are rotatably coupled about a screw.

14. The camera mount of claim 8 wherein the first and second arms comprise metal.

15. The camera mount of claim 8 wherein the attachment is configured to be removably coupled to a smartphone.

16. A method of inspecting a location, comprising:
  providing an inspection device, the inspection device comprising;
    a plurality of poles including an outermost pole and an innermost pole, the plurality of poles configured to nest at least partially within the outermost pole;
    a plurality of clamps coupled to the plurality of poles such that the plurality of poles can be extended outward from the outermost pole and clamped in place to create a longer composite pole;
    a camera mount coupled to the innermost pole, such that when extended outward the camera mount will be distal to the outermost pole;
  a wire extending from the camera mount through one or more of the plurality of poles, the wire controlling the tilt of the camera mount; and
    a tripod portion coupled to the outermost pole, the tripod portion comprising a base and a plurality of legs extending from the base to a plurality of support legs, the plurality of support legs coupled to an end of the outermost pole, each leg of the tripod mount including a wheel, and one or more of the legs including a ballast hook, the ballast hook sited on the one or more legs such that a ballast on the ballast hook does not interfere with the operation of the wheels;
attaching a camera to the camera mount;
communicatively coupling the camera to a mobile device;
extending the plurality of poles to create a composite pole;
placing the inspection device near a location;
directing the camera to view the location; and
viewing the location via the mobile device.

17. The method of claim 16 wherein the inspection device further comprises a spool holding the wire, wherein the wire is coupled to the camera mount and operable to be manipulated by a user to adjust a position of the camera mount.

18. The method of claim 17 further comprising adjusting the position of the camera mount by manipulating the wire.

19. The method of claim 16 further comprising attaching the ballast to the inspection device using the ballast hook.

* * * * *